US006819895B2

(12) United States Patent
Suzuki

(10) Patent No.: US 6,819,895 B2
(45) Date of Patent: Nov. 16, 2004

(54) IMAGE FORMING APPARATUS EQUIPPED WITH FIXING DEVICE

(75) Inventor: Kazuhiro Suzuki, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/370,491

(22) Filed: Feb. 24, 2003

(65) Prior Publication Data

US 2004/0165911 A1 Aug. 26, 2004

(51) Int. Cl.[7] .......................... G03B 15/20; G03B 21/16

(52) U.S. Cl. ........................ 399/122; 399/124; 399/328

(58) Field of Search ................................ 399/122, 124, 399/125, 110, 320, 328; 219/216; 347/156

(56) References Cited

U.S. PATENT DOCUMENTS 5,579,098 A * 11/1996 Noguchi et al. ............ 399/122
5,742,878 A * 4/1998 Kuroda ....................... 399/122
5,835,835 A * 11/1998 Nishikawa et al. ......... 399/328
6,047,158 A * 4/2000 Morigami et al. .......... 399/328
6,763,211 B2 * 7/2004 Yokoyama .................. 399/122

FOREIGN PATENT DOCUMENTS

| | | | |
|---|---|---|---|
| JP | 4-305662 A | | 10/1992 |
| JP | 07-210023 | * | 8/1995 |
| JP | 10-301432 A | | 11/1998 |
| JP | 10-319771 A | | 12/1998 |
| JP | 11-015323 | * | 1/1999 |
| JP | 2001-318555 A | | 11/2001 |
| JP | 2001-356539 | * | 12/2001 |
| JP | 2002-072720 A | | 3/2002 |

* cited by examiner

*Primary Examiner*—Sophia S. Chen
(74) *Attorney, Agent, or Firm*—Foley & Lardner LLP

(57) ABSTRACT

An image forming apparatus includes a box shaped main body and a fixing device that is provided in the main body. The fixing device includes a heating roller that has a length nearly corresponding to the maximum width of paper and a pressure roller that has a substantially same length as the length of the heating roller and comes in contact with the heating roller, and a contact/separation mechanism to bring the pressure roller into contact with or separate from the heating roller. The fixing device can be taken out of the main body by moving it in the direction orthogonal to the long direction of the heating roller and the pressure roller.

15 Claims, 6 Drawing Sheets

IMAGE FORMING APPARATUS EQUIPPED WITH FIXING DEVICE

BACKGROUND OF THE INVENTION

1. Field of the Invention

The present invention relates to an image forming apparatus with a fixing device that is capable of easily removing paper jammed in a nip.

2. Description of the Related Art

A fixing device incorporated in an image forming apparatus is composed of a heating roller and a pressure roller that is in pressure contact with the heating roller. The pressure roller is provided with a pressurizing mechanism to pressure contact the pressure roller to the heating roller. This pressurizing mechanism also serves as a pressure releasing mechanism to release pressure.

However, when a sheet of paper is jammed in the bellows shape in the nip position between the heating roller and the pressure roller, it is difficult for a user to release the jamming of paper. Therefore, a serviceman removes a fixing device from the main body of the image forming apparatus and removes a cover fixed to the fixing device with screws for a user. Further, a serviceman released the pressure roller from the heating roller and removed jammed paper.

A fixing device capable of easily removing jammed paper is disclosed in Japanese Patent Publication No. 2001-318555 (Laid open to public inspection on Nov. 16, 2001). This fixing device is composed of a heating roller, a pressure roller to pressure contact this heating roller, a pressurizing means to pressing the pressure roller to the heating roller, and a pressure releasing lever to release the pressing force of the pressurizing means. Further, this fixing device is provided with a separating mechanism to separate the pressure roller from the heating roller interlocking with the pressing force releasing operation by the pressure releasing lever. That is, the fixing device has the separating mechanism to separate the pressure roller from the heating roller interlocking with the pressing force releasing operation by the pressure releasing lever, a sheet of paper jammed in the bellows shape can be easily pulled out. Accordingly, a jammed paper can be removed certainly without leaving broken pieces of the paper between the heating roller and the pressure roller.

However, the above-mentioned fixing device was fixed with screws or an engaging mechanism in the main body of an image forming apparatus. In this case, when the paper jamming is caused, the fixing device cannot be easily taken out of the main body and there was such a defect that the operability became bad.

In Japanese Patent Publication No. 10-301432 (laid open to public inspection on Nov. 13, 1998), an image forming apparatus capable of releasing pressure of the pressure roller and easily detaching a fixing device from the main body of the apparatus is disclosed. That is, this apparatus is provided with slide rails that are supported slidably in the main body, a fixing device that is held detachably to/from the slide rails, and an operating means provided between the main body and the fixing device for approving the pull-out of the fixing device and releasing the pressure contact between the hearing roller and the pressure roller. According to this structure, when troubles such as paper jamming and the like are caused, the fixing device can be easily removed or installed. In addition, the image forming apparatus is equipped with the pressure contact of the pressure roller releasing mechanism and an effect to easily remove jammed paper is provided. However, the above-mentioned fixing device can be removed easily from the main body of the apparatus but the fixing device is also completely removed from the slide rails. It will be dangerous to remove jammed sheets by putting the heated fixing device on a table. In addition, to insert the once removed fixing device to insert into the main body of the apparatus, the fixing device must be engaged with the slid rails again and a difficult work is required to return the fixing device into the main body of the apparatus. Furthermore, the fixing device is moved along the longitudinal direction of the heating roller and the pressure roller and therefore, the moving distance is long and the work is worrisome.

SUMMARY OF THE INVENTION

An object of the present invention is to provide an image forming apparatus capable of moving a fixing device easily from the main body to the outside and certainly removing jammed paper by separation the pressure roller from the heating roller.

According to the present invention, an image forming apparatus is provided. This image forming apparatus comprises: a box shaped main body and a fixing device provided in the main body. This fixing device is composed of: a heating roller having a length nearly corresponding to the maximum width of paper; a pressure roller having a substantially same length as the length of the heating roller and is brought in contact with the heating roller; and a pressure contacting/separating mechanism to press contact/separate the pressure roller to/from the heating roller. The fixing device can be taken out to the outside by moving it in the direction orthogonal to the long direction of the heating roller and the pressure roller.

Further, according to the present invention, an image forming apparatus is provided. This image forming apparatus comprises: a box shaped main body; guide members fixed in the inside of the main body; rail members attached to the guide members so as to slide on the guide member; supporting members fixed to the rail members so as to pull out to the outside from the main body; and a fixing device fixed to the supporting members and movable between the inside and the outside of the main body of the image forming apparatus.

DETAILED DESCRIPTION OF THE INVENTION

A first embodiment of the present invention will be described referring to the attached drawings.

Figure 1:
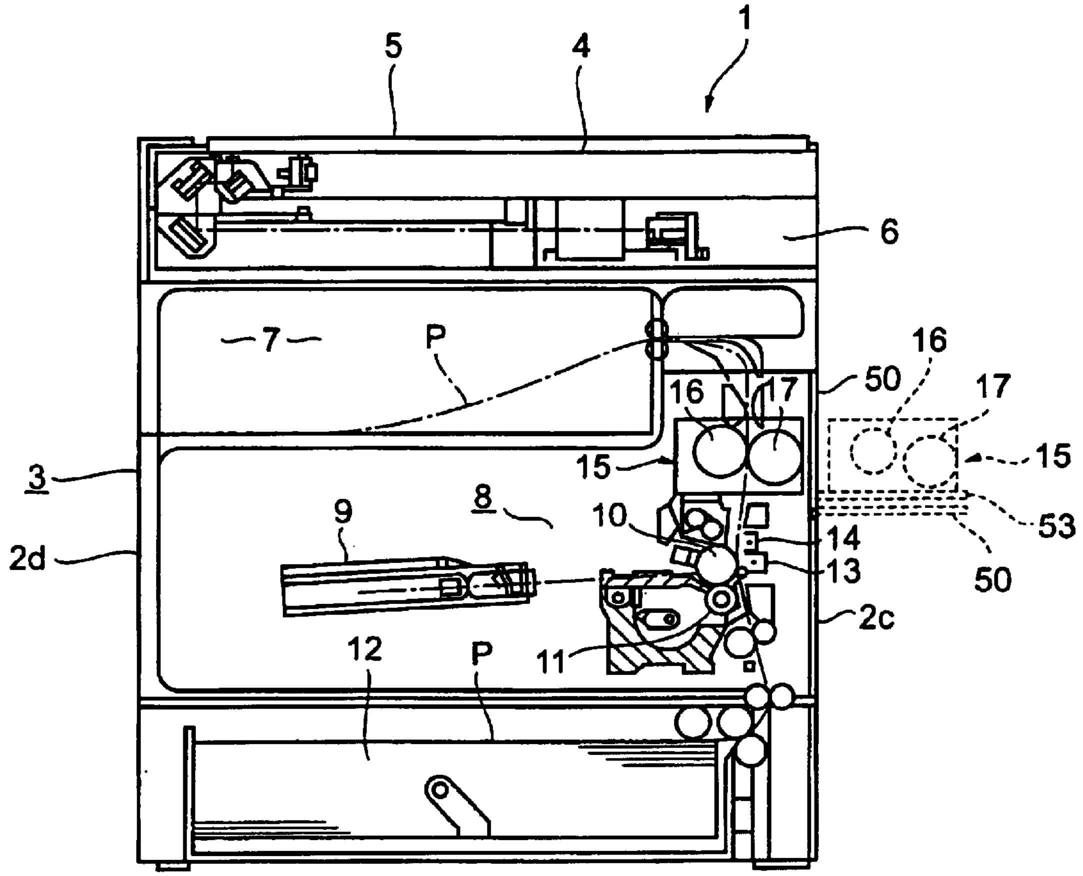
FIG. 1 is a front view schematically showing the structure inside a copying machine.

FIG. 1 shows a copying machine 1 as an example of an image forming apparatus. The copying machine 1 has a box type main body 3 comprising a top surface, a bottom surface, a front surface 2*a*, a rear surface 2*b*, first and second sides 2*c* and 2*d*, and a document table 4 on which documents that are objects to be copied. On the document table 4, a cover 5 for retaining documents is provided so that it can be opened/closed.

Below the document table 4, there is provided a scanner section 6 to apply a light to a document placed on the document table 4, read the reflected light as image data and generate image signal based on the read image data.

Below the scanner section 6, there is provided a paper receiving portion 7 to receive a discharged image formed and paper P.

Further below the paper receiving portion 7, there is an image forming portion 8 to form an image on a paper P based on an image signal that is generated in the scanner section 6 or an image signal that is input from an external device (not shown).

The image forming portion 8 includes an exposing device 9, a photosensitive drum 10, a developing device 11, a transfer charger 13, and separation charger 14. The exposing device 9 injects laser beams corresponding to image signals supplied from the scanner portion 6 or an external device. An electrostatic latent image is formed on the surface of the photosensitive drum 10 based on the exposing scanning by the laser beams injected from the exposing device 9. The developing device 11 forms a toner image by feeding toners to an electrostatic latent image formed on the surface of the photosensitive drum 10. The transfer charger 13 transfers a toner image formed on the surface of the photosensitive drum 10 on a paper P taken out from a paper supply cassette 12. The separation charger 14 functions to separate the paper P with the toner image transferred from the surface of the photosensitive drum 10.

In the conveying path of the paper P passed the separation charger 14, there is provided a fixing device 15 that allows the paper P having a transferred toner image. The fixing device 15 is so provided that it can be taken out to the outside of the main body 3 by opening the cover 50 provided on the first side 2*c* of the main body 3 as described later. The fixing device 15 is composed of a heating roller 16 having a slightly longer size than the maximum width size of a paper P and a pressure roller 17 that pressure contacts the heating roller 16 and physically in the same length as the heating roller 16. When a paper P having a toner image formed thereon passes a nip portion formed between the heating roller 16 and the pressure roller 17, the toner image is fused by the heat and the fused toner image is fixed on the paper P.

The paper P conveyed in the vertical direction and passed through the fixing device 15 is bent by about 90° in the left direction shown in FIG. 1 and discharged in the paper receiving portion 7.

Figure 2:
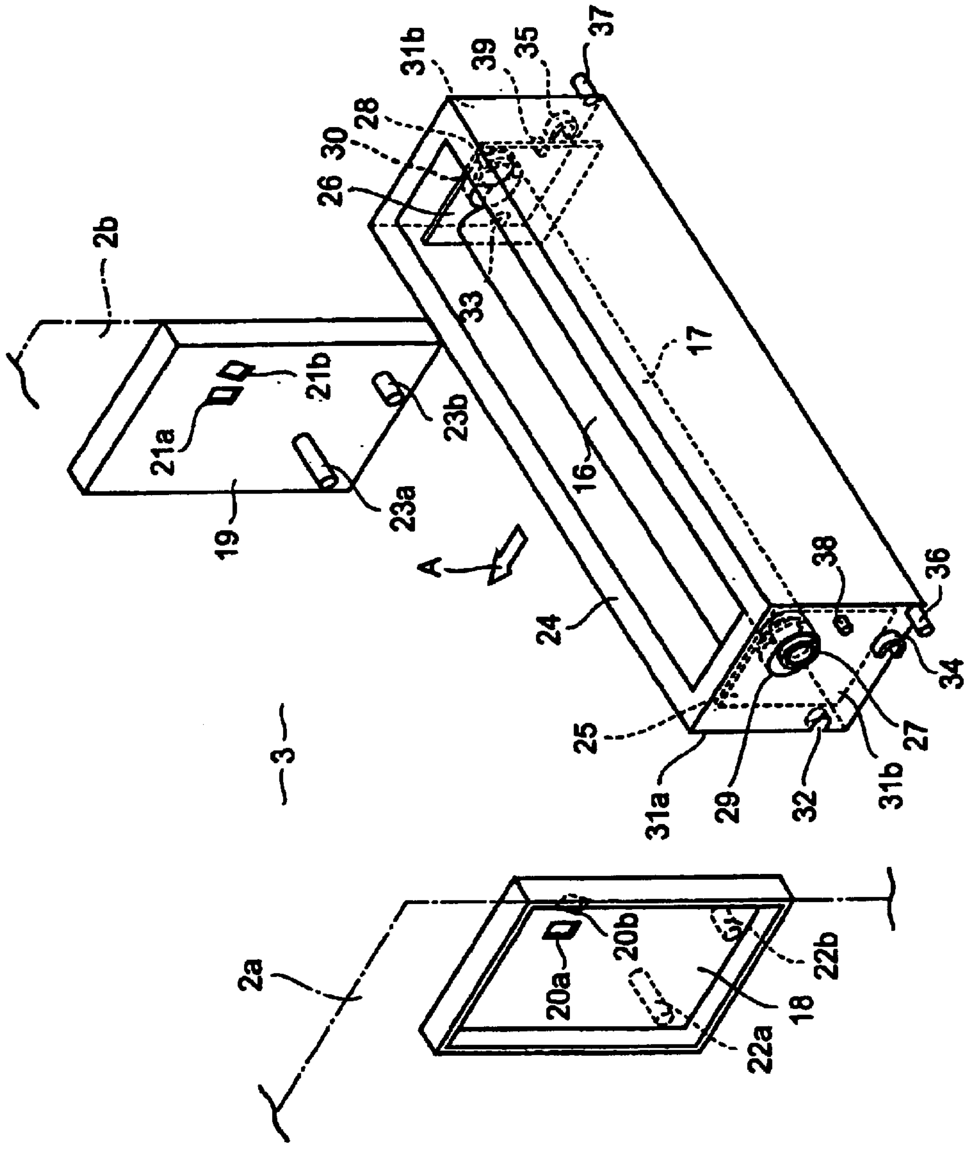
FIG. 2 is a perspective view showing a fixing device removed from the main body of a copying machine.

As shown in FIG. 2, first and second holes 20*a* and 20*b* are formed in parallel to each other on a front frame 18 arranged at the front surface 2*a* side of the main body 3. On a rear frame 19 arranged at the rear surface 2*b* side of the main body 3, a first hole 21 and a second hole 21*b* are formed side by side opposing to the first hole 20*a* and the second hole 20*b* on the front frame 18 side. A latch 47 provided on an oscillation lever 40 that is described later is engaged with these holes 20*a*, 20*b*, 21*a* and 21*b*. Below the first and second holes 20*a* and 20*b* formed on the front frame 18, a first pin 22*a* and a second pin 22*b* are provided with a prescribed distance between them. Similarly, below the first and second holes 21*a* and 21*b* formed on the rear frame 19, first and second pins 23*a* and 23*b* are provided with a prescribed distance between them. When viewed from the side surface 2*c* of the main body 3, the inner side first pin 22*a* and the first pin 23*a* are somewhat longer than the second pins 22*b* and 23*b* at this side.

The holes 20*a*, 20*b*, 21*a* and 21*b* and the pins 22*a*, 22*b*, 23*a* and 23*b* are used for fixing the fixing device 15 in the main body 3.

The fixing device 15 is arranged in a slender box shaped cover with the top opened and composed of the heating roller 16 slightly longer than the maximum width size of paper P and the pressure roller 17 in the almost same length of the heating roller 16. The heating roller 16 and the pressure roller 17 are mounted in the cover 24 via a pair of the frames 25 and 26. Both ends of the pressure roller 17 are mounted rotatably to the cover 24 via bearings 27 and 28 provided to the cover 24. The bearings 27 and 28 are mounted to oblong holes 29 and 30 formed on the cover 24 movably in the nearly horizontal direction. Both ends of the pressure roller 17 are inserted into the oblong holes (not shown) formed on a pair of the frames 25 and 26 arranged in the cover 24.

Below both ends of the back surface 31*a* in the longitudinal direction of the cover 24, a first U-shape hollow fixing guides 32 and 33 are formed. That is, the first fixing guides 32 and 33 are located in the hollow positions from the hollow positions from both side surfaces 31*b* of the cover 24. Further, below the both side surfaces 31*b* of the cover 24, there are formed second guides 34 and 35 projecting in the U-shape, respectively.

On the both side surfaces 31*b* of the cover 24, there are shafts 36 and 37 are projecting for mounting an oscillation lever 40 (FIG. 3) so as to oscillate. Further, on the both side surfaces 31*b* of the cover 24, projecting guide pins 38 and 39 are provided to guide the oscillation of the oscillation levers 40 by engaging in the guide holes 49 (FIG. 3) formed on the oscillation levers 40.

Figure 3:
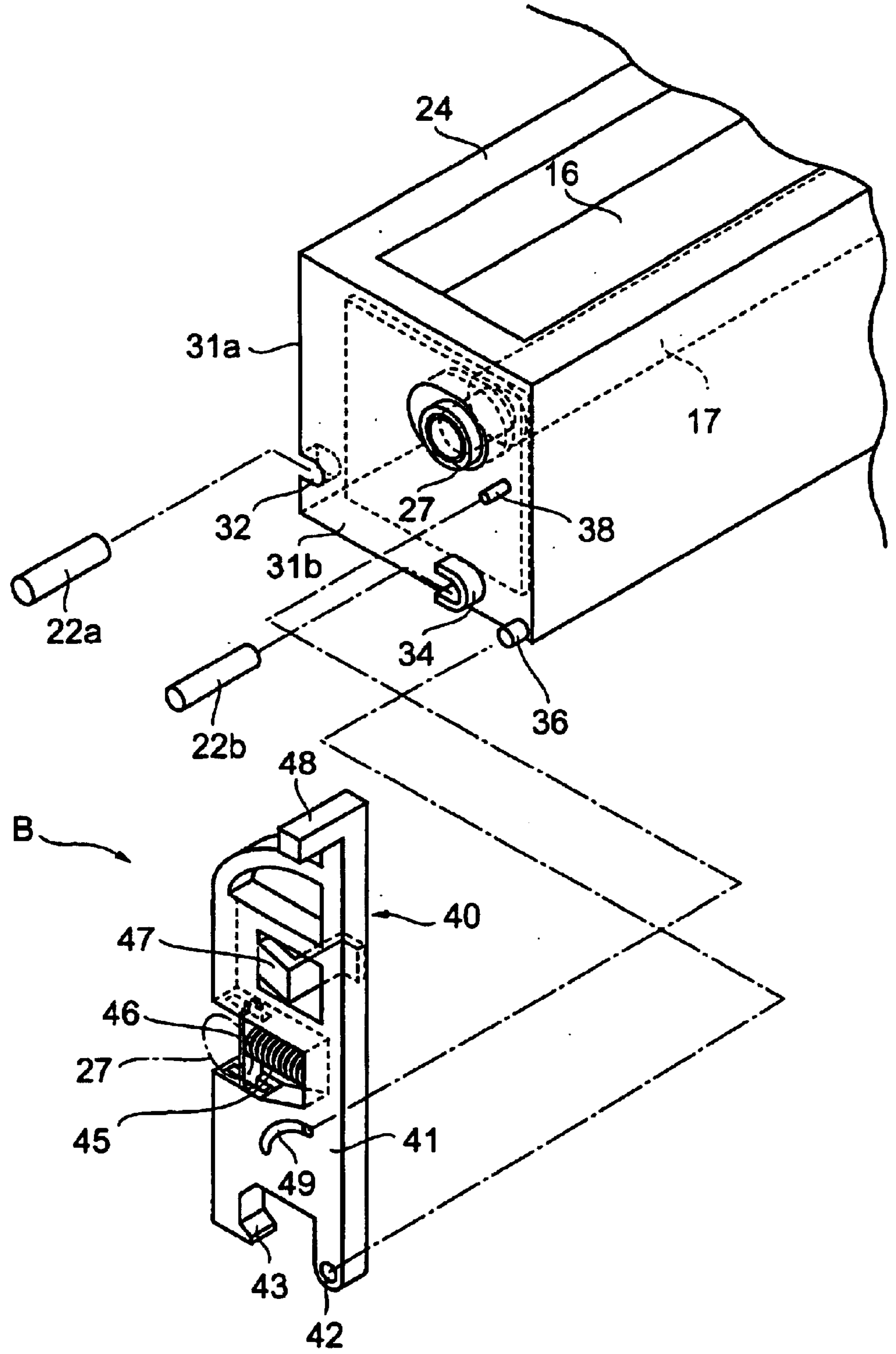
FIG. 3 is an exploded perspective view showing the structure of an oscillation lever and a structure to attach the oscillation lever to the cover of a fixing device.

FIG. 3 shows a pressure contacting/separating mechanism B for pressure contacting/separating the pressure roller 17 to/from the heating roller 16. This pressure contacting/separating mechanism B includes the oscillation levers 40 mounted to both side surfaces 31*b* of the cover 24. Further, two units of the oscillation levers 40 are provided as they are mounted to both side surfaces 31*b*. In FIG. 3, one oscillation lever 40 mounted to one side surface 31*b* opposing to the front frame 18 is shown.

The oscillation lever 40 is formed with a slender plastic plate 41. At this side of the lower end of the plate 41, a supporting hole 42 is formed for fixing the plate 41 rotatably by inserting the shaft 36 provided on the cover 24 projecting therefrom. Further, at the rear side of the lower end of the plate 41, there is formed an engaging claw 43 that is engaged with the pin 22*b* provided on the front frame 18 projecting therefrom.

At the middle portion in the longitudinal direction of the plate 41, a notch shape housing 44 is formed. A spring 45 is housed in the housing 44. That is, one end of the spring 45 is fixed to the inner side wall of the housing 44 and a pressure plate 46 is attached movably to the free end of the spring 45. The pressure plate 46 contacts the outer surface of the bearing 27 that supports the pressure roller 17.

Above the housing 44 formed on the plate 41, a latch 47 projecting to the front frame 18 side is formed. The latch 47 is formed to be able to project/retract to/from the plate 41 so as to engage in the first and second holes 20*a* and 20*b* formed on the front frame 18.

On the upper edge of the plate 41, a handle 48 is formed for a user to grasp when oscillating the plate 41.

Further, below the housing 44 formed on the plate 41, a circular slit 49 is formed. The guide pin 38 that is projecting to the side 31*b* of the cover 24 is inserted into this slit 49. That is, the slit 49 and the guide pin 38 inserted into the slit 49 function as the guide when oscillating the plate 41.

Figure 4C:
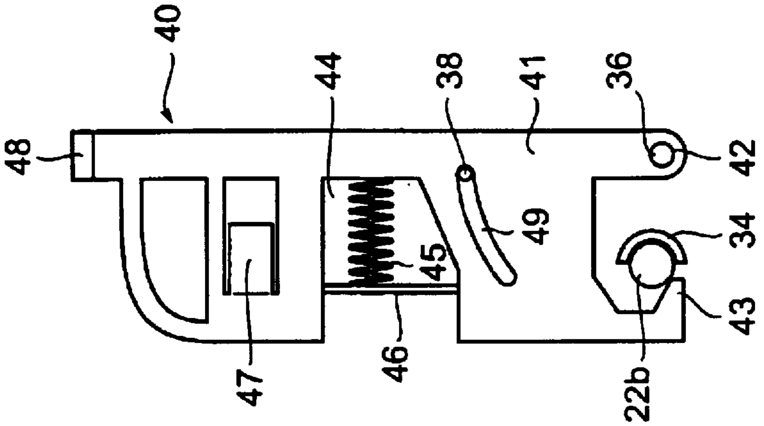
FIG. 4 is front views showing the state to fix the oscillation lever at 3 stage positions.
Figure 4B:
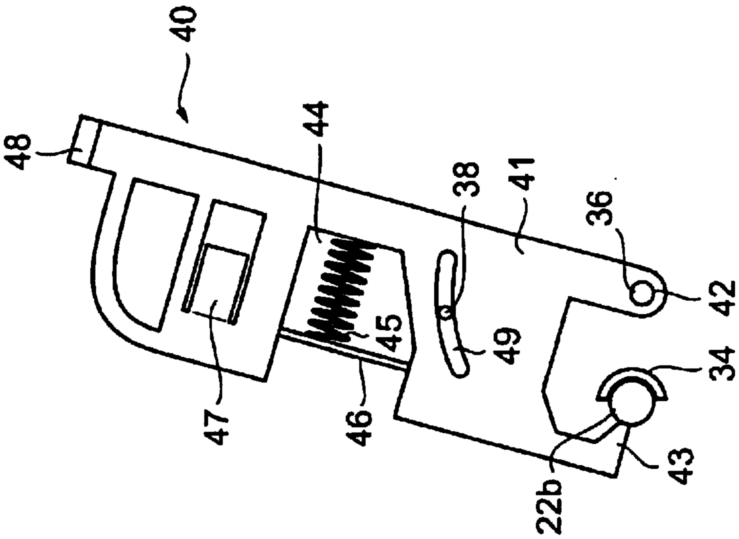

Next, the operation when installing the fixing device in the main body 3 will be explained referring to FIG. 2~FIG. 4.

Figure 4A:
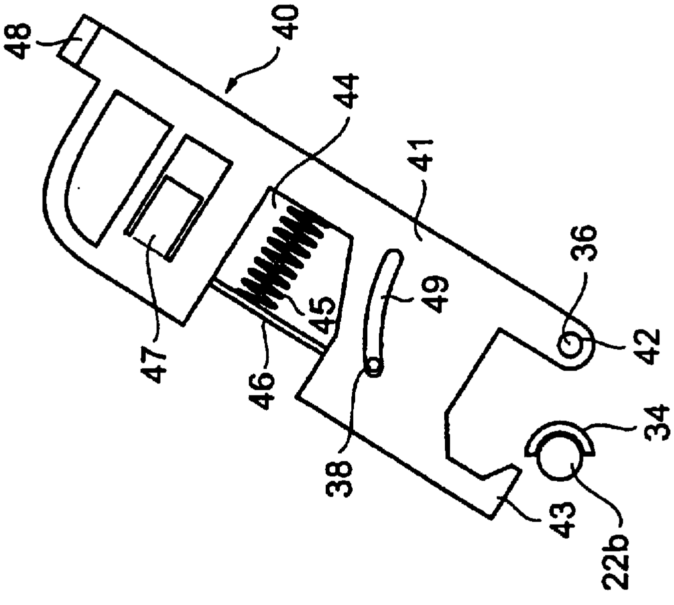

The oscillation lever is mounted to the side 31*b* in the state able to oscillate, and the fixing device 15 is inserted between the front frame 18 and the rear frame 19 in the arrow direction A in the tilted state shown in FIG. 4A. When the fixing device 15 is inserted, the first fixing guides 32 and 33 engage with the first pins 22*a* and 23*a*, respectively, third guides 34 and 35 engage with the second pins 22*b* and 23*b*, respectively, and the fixing device 15 is stopped. In this state of the fixing device 15 stopped, when a user pushes the oscillation lever 40 to the position shown in FIG. 4C by way of the state shown in FIG. 4B by grasping the handle 48, the latch 47 goes into the first holes 20*a* and 21*a* formed on the front frame 18 and the rear frame 19 and engages with the holes.

By the above operations, the fixing device 15 is fixed in the main body 3. Then, when the cover 50 provided on the side 2*c* of the main body 3 is closed, the fixing device 15 becomes usable.

Next, the operation to separate the pressure roller 17 in the fixing device 15 from the heating roller 16 when removing a jammed paper P in the fixing device 15 and the operation to remove the fixing device 15 from the main body 3 will be explained below referring to FIG. 1~FIG. 4.

A user opens the cover 50 provided on the side 2*c* of the main body 3 to the position shown in the dotted line in FIG. 1 so as to be able to access the fixing device 15. As the oscillation lever 40 is at the position shown in FIG. 4C, the pressure roller 17 is in contact with the heating roller 16 by the spring 45 and the pressure plate 46. When a user depresses the latch 47, it comes off the first hole 20*a* and the engagement of the latch 47 with the first hole 20 is released (the first hole 21 and the latch 47 at the right side is also released similarly). Thereafter, when the oscillation lever 40 is turned down by pinching the handle 48 of the oscillation lever 40, the latch 47 goes into the second hole 20*b* and the oscillation lever is engaged with the latch 47 and the second hole 20*b* and stops to move. At this time, the press contact of the pressure roller 17 to the heating roller 16 by the pressure plate 46 is released, and the pressure roller 17 is slightly separated from the heating roller 16. At this time, user is able to remove a jammed paper P from the fixing device 15.

However, when it is difficult to remove a jammed paper in the above-mentioned state, it is also possible to take out the fixing device 15 to the outside from the main body 3.

That is, in the fixing device is engaged with the latch 47 and the second hole 20*b*, when user depresses the latch 47, the latch 47 comes off the second hole 20*b* and the engagement of the latch 47 with the second hole 20*b* is released. (Similarly, the engagement of the right side second hole 21*b* with the latch 47 is released). Therefore, it is only required to further turn down the oscillation lever 40 to the position shown in FIG. 4A. At this time, the engagement of an engaging claw 43 formed on the lower edge of the oscillation lever 40 with the second pin 22 is released. As the engaging claw 43 comes off the second pin 22*b*, user is enabled to remove the fixing device 15 to the outside of the main body 3. When the fixing device 15 is removed to the outside, a paper P jammed in the fixing device can be easily removed.

Further, in the above embodiment, the fixing device 15 is taken out to the outside of the main body 3 by moving in the direction orthogonal to its longitudinal direction. Accordingly, when compared with an image forming apparatus of which fixing device cannot be taken out from the main body unless the heating roller and pressure roller are moved in the longitudinal direction like the fixing device disclosed in the above-mentioned Japanese Patent Application No. 10-301432, the moving distance of the fixing device of this invention is short and the fixing device 15 can be easily taken out to the outside of the main body.

Next, a second embodiment of the present invention wherein the fixing device can be easily installed/removed to/from the main body will be explained referring to FIG. 5. Further, the same component elements as those in the first embodiment will be assigned with the same reference numerals and the detailed explanation thereof will be omitted.

On the front surface 2*a* and the rear surface 2*b* of the main body 3, slide guides 51 and 52 are provided, respectively. In the slide guides 51 and 52, slide rails 53 and 54 are inserted to slide back and forth. At both ends of the slide rails 53 and 54, roller pairs 55*a*, 55*b* and 56*a*, 56*b* are mounted. There is a supporting frame 57 connected to connect a pair of rails 53 and 54. At both ends of the supporting frame 57, there are arranged the front frame 18 and the rear frame 19 for fixing the fixing device 15 similar to those shown in FIG. 2. On the front frame 18 and the rear frame 19, the first holes 20*a*, 21*a*, the second holes 20*b*, 21*b*, the first pins 22*a*, 23*a* and the second pins 22*b*, 23*b* are formed likewise those explained in the first embodiment.

Further, magnets 58 and 59 are attached to the edges of the front frame 18 and the rear frame 19.

Figure 5:
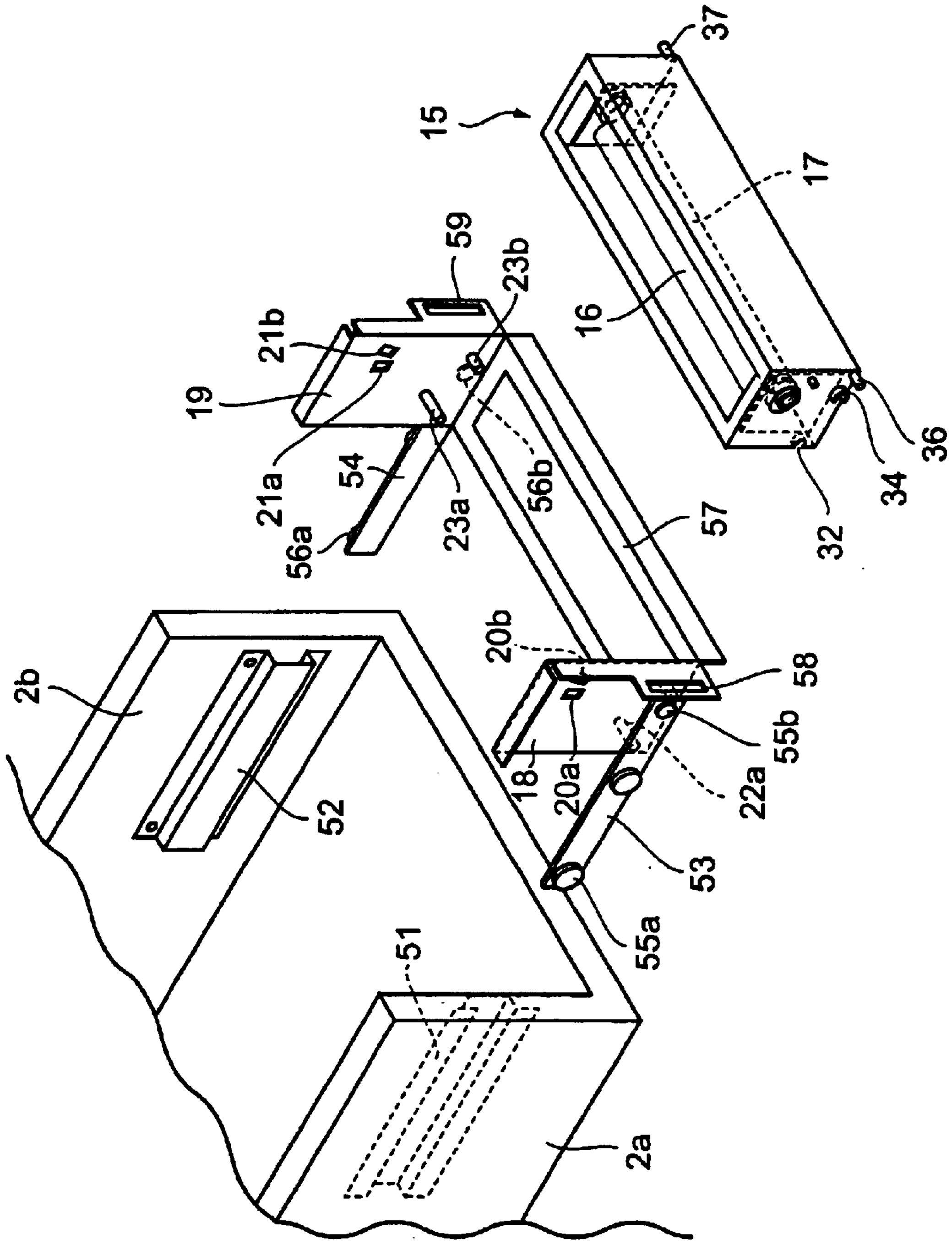
FIG. 5 is a exploded perspective view showing the main body of a copying, supporting frames and a fixing device in a second embodiment.

FIG. 5 shows the state of the fixing device 15 that is removed from the supporting frame 57. To install the fixing device 15 to the supporting frame 57, insert the fixing device 15 between the front frame 18 and the rear frame 19 as explained in the first embodiment. The first fixing guides 32 and 33 engage with the first pins 22*a* and 23*a*, respectively. At the same time, the third guides 34 and 35 engage with the second pins 22*b* and 23*b*, respectively and the fixing device 15 is mounted to the supporting frame 57. In this state of the fixing device 15 installed, when a user pushes the oscillation lever 40 to the position shown in FIG. 4C by way of the state shown in FIG. 4B by grasping the handle 48, the latch 47 goes into the first holes 20*a* and 21*a* formed on the front frame 18 and the rear frame 19 and is engaged there, and the fixing device 15 is completely fixed to the supporting frame 57.

When the fixing device 15 fixed on the frame 57 is pushed in the direction of the main body 3, the guide rails 53 and 54 are slid in the slide guides 51 and 52 and the fixing device 15 is set between the front surface 2*a* and the rear surface 2*b* of the main body 3. At this time, the magnets are electrically absorbed to the edges of the front surface 2*a* and the rear surface 2*b* and fixed definitely in the main body 3, and the cover 50 is closed.

When the cover 50 is opened and he fixing device 15 is pulled out of the main body 3, the fixing device 15 can be moved to the position shown by the dotted line in FIG. 1.

With the fixing device 15 at this position, a jammed paper can be removed.

Figure 6:
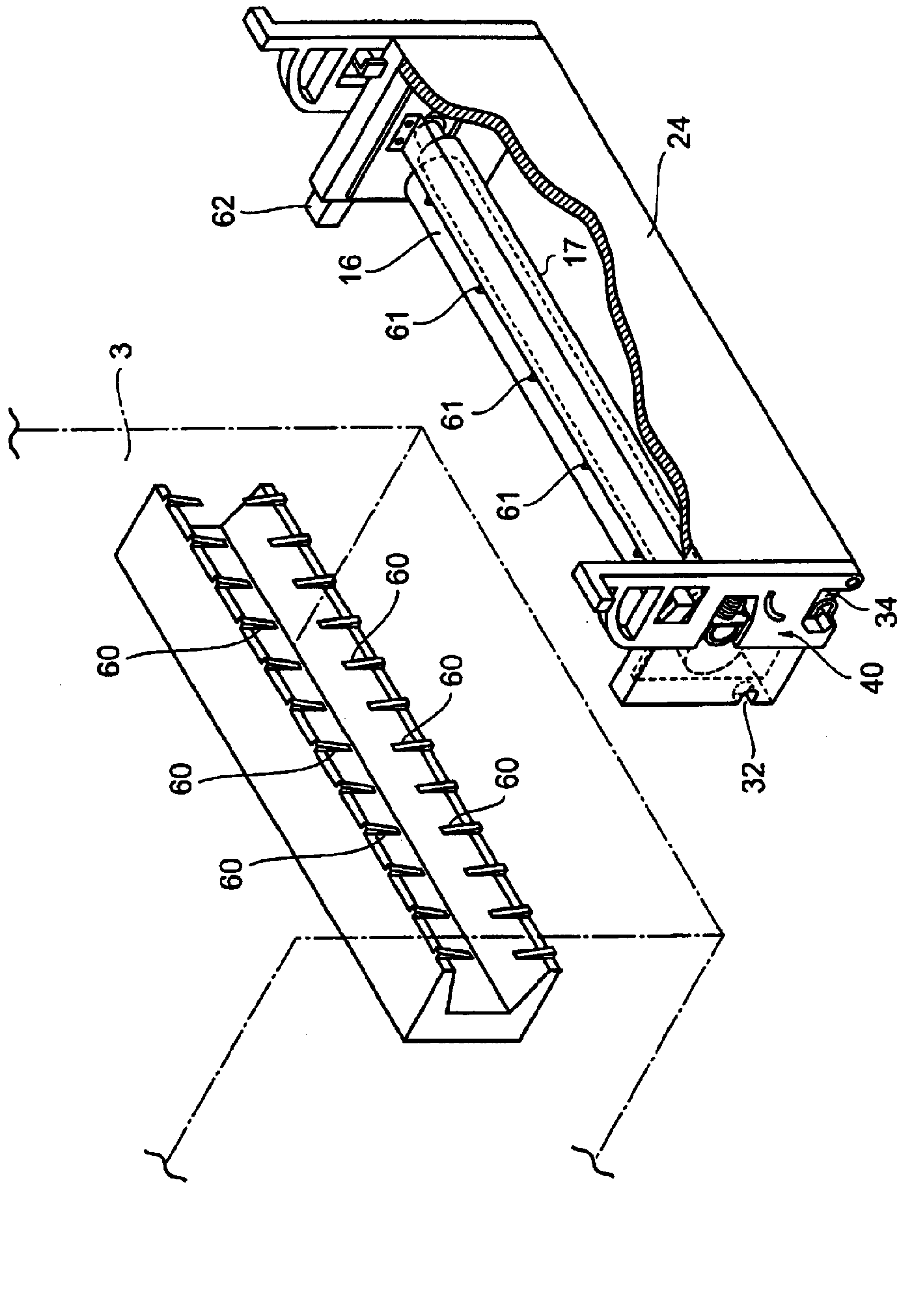
FIG. 6 is a perspective view showing the partially cut fixing device removed from the main body to the outside.

FIG. 6 shows the state of the fixing device 15 removed to the outside of the main body 3. There are provided a first conveying guide comprising a plurality of guide claws and the second conveying guides 61 comprising a plurality of guide claws for conveying a paper P smoothly between the heating roller 16 and the pressure roller 17. When the fixing device 15 is removed to the outside from the main body 3, the second conveying guide 61 is taken out in one unit with the fixing device 15 but the first conveying guide 60 is so provided as to remain in the main body 3.

Further, there is a connector 62 provided on the right side of the fixing device 15 shown in FIG. 6. The connector 62 does not supply electric power to the fixing device 15 when it was taken out to the outside but supplies power from the power source portion of the main body 3 to heat the heating roller 16 of the fixing device 15 when the fixing device 15 is returned in the main body 3. Accordingly, during the work to move the fixing device 15 to the outside of the main body 3 and remove a jammed paper, no power is supplied and the heating roller is cooled down gradually and thus, there is an effect not to cause burn injury or other accidents.

As described above in detail, according to the present invention, while securing safety of user, a paper jammed in the nip position between the heating roller and the pressure roller can be easily removed by separating the pressure roller from the heating roller. According to the second embodiment wherein the fixing device is removed to the outside of the main body by way of the rails, a jammed paper can be removed in the state with the fixing device is pulled out to the position shown by the dotted line in FIG. 1. In addition, the fixing device is moved in the direction orthogonal to its longitudinal direction and therefore, its moving distance can be made short.

What is claimed is:

1. An image forming apparatus comprising:

a box shaped main body; and a fixing device provided in the main body, the fixing device including:

a heating roller having a length nearly corresponding to the maximum width of paper;

a pressure roller having the same length substantially as the heating roller, the pressure roller being provided in pressure contact with, and in a substantially horizontal direction with respect to, the heating roller to form a nip therebetween through which the paper having a toner image passes in a substantially vertical direction; and a contacting/separating mechanism to move the pressure roller in substantially the horizontal direction and to make the pressure roller in pressure contact with or separate from the heating roller, wherein the fixing device can be moved out from the main body by moving in the horizontal direction.

2. The image forming apparatus according to claim 1, wherein the box shaped main body has a side surface to a front surface of an operating side by user and the fixing device can be taken out from the side surface.

3. The image forming apparatus according to claim 1, wherein the fixing device can be removed to the outside from the main body when the pressure roller is separated from the heating roller by the contacting/separating mechanism.

4. The image forming apparatus according to claim 1 further comprising:

a connector provided to the fixing device that does not supply electric power to the fixing device when the fixing device is removed from the main body and supplies electric power to the fixing device when the fixing device is returned in the main body.

5. The image forming apparatus according to claim 1 further comprising:

first and second conveying guides provided to guide the conveyance of the paper to pass the nip between the heating roller and the pressure roller of the fixing device, wherein the second conveying guide is taken out in one unit with the fixing device but the first conveying guide remains in the main body when the fixing device is moved out from the main body.

6. An image forming apparatus, comprising:

a box shaped main body; and a fixing device provided in the main body, the fixing device including:

a heating roller having a length nearly corresponding to the maximum width of paper;

a pressure roller having the same length substantially as the heating roller in pressure contact with the heating roller; and a contacting/separating mechanism to press contact/separate the pressure roller to/from the heating roller, wherein the fixing device can be moved out of the main body by moving in the direction orthogonal to the long direction of the heating roller and the pressure roller, wherein the contacting/separating mechanism includes:

a cover to house the heating roller and the pressure roller and has a side surface;

an oscillation lever of which one end is pivoted to freely oscillate on the side surface of the cover; and a spring provided to the oscillation lever to press the pressure roller against the heating roller.

7. The image forming apparatus according to claim 6 further comprising:

a latch provided to the oscillation lever to be able to project/retract; and first and a second holes provided to the main body at a first position of the pressure roller to press contact the heating roller and a second position of the pressure roller is separated from the heating roller to which the latch of the oscillation lever engages correspondingly.

8. The image forming apparatus according to claim 6 further comprising:

a first fixing guide provided by denting on the side surface of the cover;

a second fixing guide provided by projecting from the side surface of the cover;

a first pin projecting in the main body to engage with the first fixing guide when the fixing device is inserted into the main body; and a second pin shorter than the length of the first pin projecting in the main body to engage with the second fixing guide when the fixing device is inserted into the main body.

9. An image forming apparatus comprising:

a box shaped main body;

guide members fixed in the main body;

rail members attached to the guide members so as to slide for the guide members;

supporting members fixed to the rail members to pull out them to the outside from the main body; and a fixing device fixed to the supporting members and movable between the inside and the outside of the main body in a horizontal direction, wherein the fixing device includes:

a heating roller having a length nearly corresponding to the maximum width of paper;

a pressure roller having the same length substantially as the heating roller, the pressure roller being provided in pressure contact with, and in a substantially horizontal direction with respect to, the heating roller to form a nip therebetween through which the paper having a toner image passes in a substantially vertical direction; and a contacting/separating mechanism to move the pressure roller in substantially the horizontal direction and to make the pressure roller in pressure contact with or separate from the heating roller.

10. The image forming apparatus according to claim 9, wherein the box shaped main body has a side surface to a front surface of an operating side of user and the fixing device is fixed to the supporting members so as to take the fixing device out to the outside from the side surface.

11. The image forming apparatus according to claim 9, wherein the fixing device can be moved to the outside from the main body when the pressure roller is separated from the heating roller by the contacting/separating mechanism.

12. The image forming apparatus according to claim 9, wherein the contacting/separating mechanism includes:

a cover having a side to house the heating roller and the pressure roller;

an oscillation lever of which one end is pivoted on the side of the cover to freely oscillate; and a spring provided to the oscillation lever to press the pressure roller to the heating roller.

13. The image forming apparatus according to claim 12 further comprising:

a latch provided to the oscillation lever to be able to project/retract; and first and a second holes provided to the main body at a first position of the pressure roller to press contact the heating roller and a second position of the pressure roller is separated from the heating roller to which the latch of the oscillation lever engages correspondingly.

14. The image forming apparatus according to claim 12 further comprising:

a first fixing guide provided by denting on the side surface of the cover;

a second fixing guide provided by projecting from the side surface of the cover;

a first pin projecting in the main body to engage with the first fixing guide when the fixing device is inserted into the main body; and a second pin shorter than the length of the first pin projecting in the main body to engage with the second fixing guide when the fixing device is inserted into the main body.

15. The image forming apparatus according to claim 9 further comprising:

a connector provided to the fixing device that does not supply electric power to the fixing device when the fixing device is removed from the main body and supplies electric power to the fixing device when the fixing device is returned in the main body.

* * * * *